United States Patent
Girwalkar et al.

(10) Patent No.: US 12,444,761 B2
(45) Date of Patent: Oct. 14, 2025

(54) FUEL CELL SYSTEM CONTAINING CATALYST BASED FUEL CONTAMINATION SENSOR AND METHOD OF OPERATING THEREOF

(71) Applicant: BLOOM ENERGY CORPORATION, San Jose, CA (US)

(72) Inventors: Laxmikant Girwalkar, San Jose, CA (US); Aniket Pratap, San Jose, CA (US); David Weingaertner, San Jose, CA (US); Srikanth Ranganathan, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 355 days.

(21) Appl. No.: 17/892,362

(22) Filed: Aug. 22, 2022

(65) Prior Publication Data

US 2023/0055849 A1 Feb. 23, 2023

(51) Int. Cl.
*H01M 8/04664* (2016.01)
*B01D 53/04* (2006.01)
(Continued)

(52) U.S. Cl.
CPC .... *H01M 8/04679* (2013.01); *B01D 53/0446* (2013.01); *B01D 53/0454* (2013.01);
(Continued)

(58) Field of Classification Search
CPC ..... H01M 2008/1293; H01M 8/04014; H01M 8/04097; H01M 8/04328; H01M 8/04365;
(Continued)

(56) References Cited

U.S. PATENT DOCUMENTS 8,643,388 B2 2/2014 Hedges
10,281,423 B1 5/2019 Ramzan et al.
(Continued)

FOREIGN PATENT DOCUMENTS

GB 2497845 A 6/2013
JP 2009181825 A 8/2013
WO 2007078291 A1 7/2007

OTHER PUBLICATIONS

Scott R. Higgins, James Ewan, Jean St-Pierre, Godwin Severa, Kevin Davies, Keith Bethune, Abas Goodarzi, Richard Rocheleau, Environmental Sensor System for Expanded Capability of PEM Fuel Cell Use in High Air Contaminant Conditions, International Journal of Hydrogen Energy, Dec. 13, 2018, pp. 22584-22594, vol. 43, Issue 50, Elsevier, Honolulu, United States of America.

*Primary Examiner* — Victoria H Lynch
(74) *Attorney, Agent, or Firm* — Evergreen Valley Law Group; Kanika Radhakrishnan (57) ABSTRACT

A method for operating a fuel cell system is provided. The method includes controlling a provision of fuel to the fuel cell system operating in a steady-state mode. The catalyst sensor is operated by providing a portion of the fuel and anode exhaust generated by the system to the catalyst sensor. Further, a change in an outlet temperature of the catalyst sensor is detected. Thereafter, it is determined whether a reformation catalyst of the catalyst sensor is poisoned by contaminants in the fuel based on the detected change in the outlet temperature.

20 Claims, 6 Drawing Sheets

(51) Int. Cl.
*H01M 8/0432* (2016.01)
*H01M 8/04701* (2016.01)
*H01M 8/04746* (2016.01)
*H01M 8/0662* (2016.01)

(52) U.S. Cl.
CPC ... *H01M 8/04328* (2013.01); *H01M 8/04365* (2013.01); *H01M 8/04731* (2013.01); *H01M 8/04761* (2013.01); *H01M 8/0675* (2013.01); *B01D 2257/30* (2013.01); *B01D 2259/402* (2013.01)

(58) Field of Classification Search
CPC ......... H01M 8/04373; H01M 8/04447; H01M 8/04679; H01M 8/04731; H01M 8/04761; H01M 8/0618; H01M 8/0662; H01M 8/0675; Y02E 60/50; B01D 2257/30; B01D 2259/402; B01D 53/0446; B01D 53/0454
See application file for complete search history.

(56) References Cited

U.S. PATENT DOCUMENTS

| | | | |
|---|---|---|---|
| 2005/0053806 A1* | 3/2005 | Mukai | H01M 8/04007 429/441 |
| 2012/0129267 A1 | 5/2012 | Daly | |
| 2020/0266658 A1* | 8/2020 | Cottuli | H01M 8/04604 |

* cited by examiner

FUEL CELL SYSTEM CONTAINING CATALYST BASED FUEL CONTAMINATION SENSOR AND METHOD OF OPERATING THEREOF

TECHNICAL FIELD

Aspects of the present invention relate to fuel cell systems and methods for detecting fuel contamination, and in particular, to catalyst-based fuel contamination detection sensors.

BACKGROUND

Fuel cells, such as solid oxide fuel cells, are electrochemical devices that can convert the energy stored in fuels to electrical energy with high efficiencies. High-temperature fuel cells include solid oxide and molten carbonate fuel cells. These fuel cells may operate using hydrogen and/or hydrocarbon fuels.

SUMMARY

According to various embodiments, a fuel cell system is provided. The fuel cell system includes a fuel cell stack, a fuel line configured to provide fuel to the fuel cell stack, a catalyst sensor configured to receive the fuel from the fuel line and anode exhaust generated by the fuel cell stack, and a controller. The catalyst sensor includes a housing having an inlet and an outlet. A fuel reformation catalyst is disposed in the housing between the inlet and the outlet. The catalyst sensor includes an inlet temperature sensor configured to detect an inlet temperature of fluid in the inlet, and an outlet temperature sensor configured to detect an outlet temperature of fluid in the outlet. The controller is configured to detect poisoning of the reformation catalyst based on temperature data provided by at least the outlet temperature sensor.

According to various embodiments, a method for operating a fuel cell system is provided. The method includes controlling the provision of fuel to the fuel cell system operating in a steady-state mode. A catalyst sensor is operated by providing a portion of the fuel and anode exhaust generated by the system to the catalyst sensor. Further, a change in the outlet temperature of the catalyst sensor is detected. Thereafter, it is determined whether a reformation catalyst of the catalyst sensor is poisoned by contaminants in the fuel based on the detected change in the outlet temperature.

According to various embodiments, a method for operating a fuel cell system is provided. The method includes controlling the provision of fuel to the fuel cell system operating in a steady-state mode. A catalyst sensor is operated by providing a portion of the fuel and anode exhaust generated by the system to the catalyst sensor and by heating the catalyst sensor using a heating element. Further, an outlet temperature of the catalyst sensor is detected and the heating element is operated to maintain the outlet temperature of the catalyst sensor at a predetermined constant value. Thereafter, it is determined whether a reformation catalyst of the catalyst sensor is poisoned by contaminants in the fuel based on a decrease in the amount of power drawn by the heating element.

In one embodiment, the controller is configured to determine the presence of fuel contaminants in the fuel, based on the temperature data provided by at least the outlet temperature sensor.

In one embodiment, the controller is configured to generate an alarm signal indicating the presence of the fuel contaminants, if the outlet temperature exceeds the inlet temperature.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Herein, ranges can be expressed herein as from "about" one particular value, and/or to "about" another particular value. When such a range is expressed, examples include from the one particular value and/or to the other particular value. Similarly, when values are expressed as approximations, by use of the antecedent "about", "approximately", or "substantially", it will be understood that the particular value forms another aspect. In some embodiments, a value of "about X" may include values of +/−1% X. It will be further understood that the endpoints of each of the ranges are significant both in relation to the other endpoint, and independently of the other endpoint.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Solid oxide fuel cell (SOFC) systems are generally considered to be high-efficiency "clean" energy generation systems that operate using hydrocarbon fuels. However, contaminants such as sulfur and phosphorous species may be present in common hydrocarbon fuels, such as natural gas, which may poison and/or permanently damage fuel cell system components. Accordingly, various embodiments utilize a catalyst sensor to efficiently detect such fuel contaminants.

Figure 1:
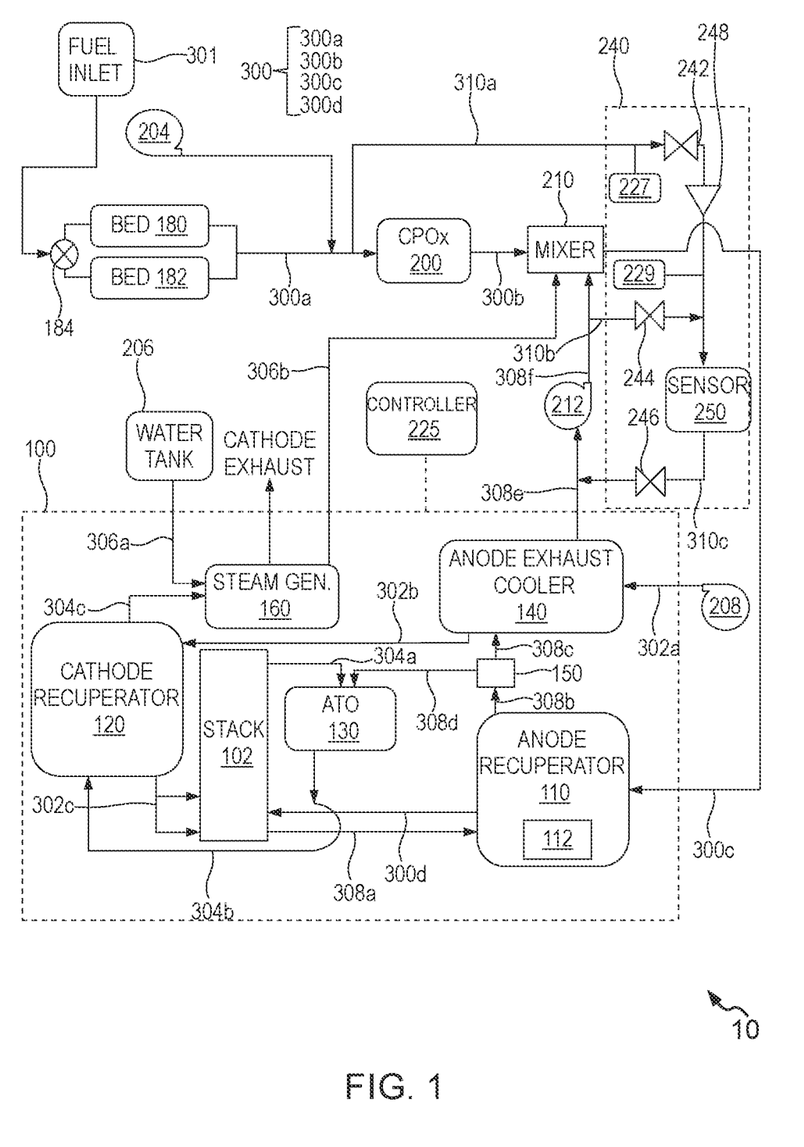
FIG. 1 is a schematic of a SOFC fuel cell system, according to various embodiments of the present disclosure.

FIG. 1 is a schematic representation of a SOFC system 10, according to various embodiments of the present disclosure. Referring to FIG. 1, the system 10 includes a hotbox 100 and various components disposed therein or adjacent thereto.

The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 120, an anode tail gas oxidizer (ATO) 130, an anode exhaust cooler (AEC) 140, a splitter 150, and a steam generator 160. Alternatively, the steam generator 160 may be replaced by a water injector which injects liquid water and/or water vapor directly into an anode exhaust stream flowing from the fuel cell stacks 102 to a mixer 210. An exemplary water injector is described in U.S. patent application Publication No. 2020/0243885 A1, published on Jul. 30, 2020, which is incorporated herein by reference in its entirely. The system 10 may also include a catalytic partial oxidation (CPOx) reactor 200, the mixer 210, a CPOx blower 204 (e.g., air blower), a system blower 208 (e.g., air blower), and an anode recycle blower 212, which may be disposed outside of the hotbox 100. Optionally, water from a water source 206 (e.g., water tank or pipe) may also be provided into the CPOx reactor 200 for use with higher hydrocarbon fuels, such as propane. However, the present disclosure is not limited to any particular location for each of the components with respect to the hotbox 100.

The system 10 may include a fuel line 300 which is fluidly connected to a fuel inlet 301 and configured to provide fuel from the fuel inlet 301 to the stacks 102. The fuel line 300 may include multiple fuel conduits that fluidly connect various elements of the system 10, such as fuel conduits 300a, 300b, 300c, 300d. The CPOx reactor 200 receives a fuel inlet stream from a fuel inlet 301, through fuel conduit 300a. The fuel inlet 301 may be a utility gas line and/or a gas tank, such as a higher hydrocarbon gas tank (e.g., a propane tank), including a valve to control the amount of fuel provided to the CPOx reactor 200. In various embodiments, a first adsorption bed 180 and a second adsorption bed 182 may be fluidly connected in parallel to the fuel conduit 300a. The first and second adsorption beds 180, 182 may be configured to adsorb sulfur species and/or other contaminants from the fuel provided to the CPOx reactor 200. The system 10 may include a selection valve 184 configured to selectively provide one of the first and second adsorption beds 180, 182 with fuel. In other words, during operation of the system 10, one of the first and second adsorption beds 180, 182 may be utilized to purify fuel, while the other bed is held in reserve for later use, has its used adsorption material replaced with fresh adsorption material, and/or is cleaned by desorbing the contaminants into an exhaust outlet (not shown). Alternatively, with additional valving, beds 180 and 182 may be configured for lead-lag operation (not shown).

The CPOx blower 204 may provide air to the CPOx reactor 200. In some embodiments, such as during cold start-up operations, the CPOx blower 204 may be operated until the fuel in fuel conduit 300 reaches the minimum reaction temperature. The fuel and/or air may be provided to the mixer 210 by fuel conduit 300b. Fuel flows from the mixer 210 to the anode recuperator 110 through fuel conduit 300c, and flows from the anode recuperator 110 to the stack 102 through fuel conduit 300d.

The fuel is then reacted in the stack 102, and the resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208. The anode exhaust may include unreacted fuel, carbon dioxide and/or water (e.g., steam). The anode exhaust may also be referred to herein as fuel exhaust.

The system blower 208 may be configured to provide an air stream (e.g., air inlet stream) to the anode exhaust cooler 140 through air conduit 302a. Air flows from the anode exhaust cooler 140 to the cathode recuperator 120 through air conduit 302b. The air flows from the cathode recuperator 120 to the stack 102 through air conduit 302c.

Anode exhaust generated in the stack 102 is provided to the anode recuperator 110 through recycling conduit 308a to heat the fuel stream provided to the anode recuperator 110 via conduit 300c. The anode exhaust may be provided from the anode recuperator 110 to a splitter 150 by recycling conduit 308b. A first portion of the anode exhaust may be provided from the splitter 150 to the anode exhaust cooler 140 by recycling conduit 308c. A second portion of the anode exhaust may be provided from the splitter 150 to the ATO 130 by recycling conduit 308d. Anode exhaust may be provided from the anode exhaust cooler 140 to mixer 210 by recycling conduit 308e. The anode recycle blower 212 may be configured to pump anode exhaust to the mixer 210 through recycling conduit 308f.

Cathode exhaust generated in the stack 102 flows to the ATO 130 through exhaust conduit 304a. Cathode exhaust and/or ATO exhaust generated in the ATO 130 flows from the ATO 130 to the cathode recuperator 120 through exhaust conduit 304b. Exhaust flows from the cathode recuperator 120 to the steam generator 160 through exhaust conduit 304c. Exhaust flows from the steam generator 160 and out of the hotbox 100 through an exhaust outlet. Alternatively, the exhaust may flow from the cathode recuperator 120 to out of the hot box 100 if the steam generator 160 is omitted.

Water flows from the water source 206, such as a water tank or a water pipe, to the steam generator 160 through water conduit 306a. The steam generator 160 converts the water into steam using heat from the ATO exhaust provided by exhaust conduit 304c. Steam is provided from the steam generator 160 to the mixer 210 through water conduit 306b. The mixer 210 is configured to mix the steam with anode exhaust and fuel. Alternatively, the steam may be provided directly into the fuel inlet stream and/or the anode exhaust stream. In another alternative embodiment, liquid water and/or water vapor may be provided into the anode exhaust stream from a water injector if the steam generator 160 is omitted.

In some embodiments, the system 10 may optionally include a pre-reformer 112. The pre-reformer 112 may include one or more catalysts configured to operate at temperatures above about 400° C. For example, the catalysts may be disposed between walls of the anode recuperator 110, or may be disposed in an opening formed within the anode recuperator 110. In other embodiments, one or more of the catalysts may be in the form of pucks or disks. In other embodiments, one or more of the pre-reformer 112 may be disposed downstream of the anode recuperator 110, with respect to a fuel-flow direction.

In various embodiments, the catalysts may include a metallic/ceramic foam with a catalytic layer (e.g., palladium, nickel, and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof. The reforming catalyst may include one or more nickel/rhodium catalysts configured to reform higher hydrocarbons (C2-C5) at very broad oxygen to carbon (O:C) ratios. For example, the reforming catalyst may be configured to reform a fuel stream having at least 10 vol % of C2 and C3 hydrocarbons, without significant coke formation. For example, the reforming catalyst 116 may be configured to reform a fuel stream having up to 20 vol %, up to 18 vol %, up to 16 vol %, up to 14 vol %, or up to 12 vol % of C2 and C3 hydrocarbons.

In some embodiments, the pre-reformer 112 may include a hydrogenation catalyst. The hydrogenation catalyst may be configured to combine unsaturated hydrocarbons, such as ethylene and/or propylene (alkenes), with available hydrogen in the fuel stream, resulting in saturated hydrocarbons, such as ethane and propane or other alkanes. The hydrogenation catalyst may be disposed upstream of the reforming catalyst or integrated throughout the reforming catalyst.

The hydrogenation catalyst may include a ceramic base, such as alumina, ceria, zirconia, or a mixture of ceria and zirconia, with a small percentage of a catalyst metal such as palladium. For example, the hydrogenation catalyst may include an amount of palladium ranging from about 0.1 wt % to about 5 wt %, such as from about 0.2 wt % to about 4 wt %, from about 0.3 wt % to about 3 wt %, or about 0.5 wt % to about 2 wt %. The hydrogenation catalyst may also include some inhibitors and/or stabilizers such as vanadium, tungsten, and/or other similar transition metal materials.

Fuel is provided from the anode recuperator 110 to the stack 102 by fuel conduit 300d, where the fuel is reacted to generate electricity. The resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system 10 may further include a controller 225 configured to control various elements of the system 10, and may optionally include a gas analyzer configured to analyze the fuel in fuel conduit 300a. For example, the controller 225 may be configured to control fuel, air flow through the system 10, and/or the operation of the CPOx reactor 200. The controller 225 may be configured to control amounts (e.g., flow rates) of steam, fuel, and anode exhaust provided to the mixer 210. In various embodiments, the controller 225 may also be configured to control relative amounts of anode exhaust provided from the stack 102 to the ATO 130 and the anode recuperator 110.

In an alternative embodiment, a hydrogen separator may be fluidly connected to the recycling conduit 308f. The hydrogen separator may comprise an electrochemical hydrogen pumping stack, such as a proton exchange membrane (PEM) stack, which separates hydrogen from the carbon dioxide in the anode exhaust, and pumps the hydrogen into the mixer 210. The carbon dioxide may be sequestered or provided for various uses (e.g., beverage carbonation, etc.).

Contaminant Detection Subsystems

In various embodiments, the system 10 may include a fuel contaminant detection subsystem 240, configured to detect contaminants, such as catalyst poisons, present in fuel provided to the system 10. Catalyst poisons may bind (reversibly or irreversibly) to system catalysts, resulting in a reduction in catalyst function (e.g., catalyst poisoning). Catalyst poisons may include sulfur species, phosphorus species, and/or other catalyst poisons that may be present in fuel.

The subsystem 240 may include a first control valve 242, a second control valve 244, a third control valve 246, a one-way valve 248 (e.g., non-return valve), and a catalyst sensor 250. The subsystem 240 may also include a first pressure sensor 227 and a second pressure sensor 229. The inlet of the catalyst sensor 250 may be fluidly connected to fuel conduit 300A by bypass conduit 310a. The bypass conduit 310a may be fluidly connected to recycling conduit 308f by bypass conduit 310b. The outlet of the catalyst sensor 250 may be fluidly connected to recycling conduit 308e by bypass conduit 310c. The first pressure sensor 227 is located on the bypass conduit 310a upstream of the first control valve 242, and may be configured to detect pressure in the bypass conduit 310a upstream of the first control valve 242, with respect to a direction of fuel flow through bypass conduit 310a. The second pressure sensor 229 may be located on the bypass conduit 310a downstream of the first control valve 242 and the one way valve 248, and may be configured to detect pressure in bypass conduit 310a downstream of the first control valve 242 and the one way valve 248, with respect to a direction of fuel flow through bypass conduit 310a.

The first, second, and third control valves 242, 244, 246 may be flow control valves, such as mass flow control valves or solenoid valves, such as proportional or binary solenoid valves. For example, the first control valve 242 may be configured to control a fluid flow rate through the bypass conduit 310a, the second control valve 244 may be configured to control a fluid flow rate through bypass conduit 310b, and the third control valve 246 may be configured to control a fluid flow rate through bypass conduit 310c. The third control valve 246 may comprise a binary solenoid valve (open/shut valve) to prevent back flow from conduit 308e to the catalyst sensor 250. The one-way valve 248 may prevent fluids from returning to fuel conduit 300a through bypass conduit 310a.

In particular, the first control valve 242 may be used to control an amount of fuel that is provided to the catalyst sensor 250 from fuel conduit 300a via the bypass conduit 310a. The second control valve 244 may be used to control an amount of recycled fuel (e.g., anode exhaust and water/steam, or hydrogen from a hydrogen separator if a hydrogen separator is present) that is provided to the catalyst sensor 250 from recycling conduit 308f via bypass conduit 310b. The third control valve 246 may be configured to control an amount of fuel and/or water that is provided from the catalyst sensor 250 to recycling conduit 308e via bypass conduit 310c or may be a binary solenoid valve (open/shut valve) used to prevent back flow from conduit 308e to the catalyst sensor 250.

The controller 225 may control the operation of the subsystem 240. In particular, the controller 225 may be configured to control a flow rate and composition of fluid provided to the catalyst sensor 250, by controlling the first, second, and/or third control valves 242, 244, 246. For example, the controller 225 may calculate a fuel flow rate to the catalyst sensor 250, based on pressure data provided by the first and second pressure sensors 227, 229, and the controller 225 may control the first control valve 242 and/or the third control valve 246, to adjust the fuel flow rate. The controller 225 may control the second control valve 244 to adjust the composition of the fluid provided to the catalyst sensor 250 e.g., the ratio of the fresh fuel to the anode exhaust and/or amounts of water, hydrogen, carbon monoxide, and/or carbon dioxide.

Figure 2:
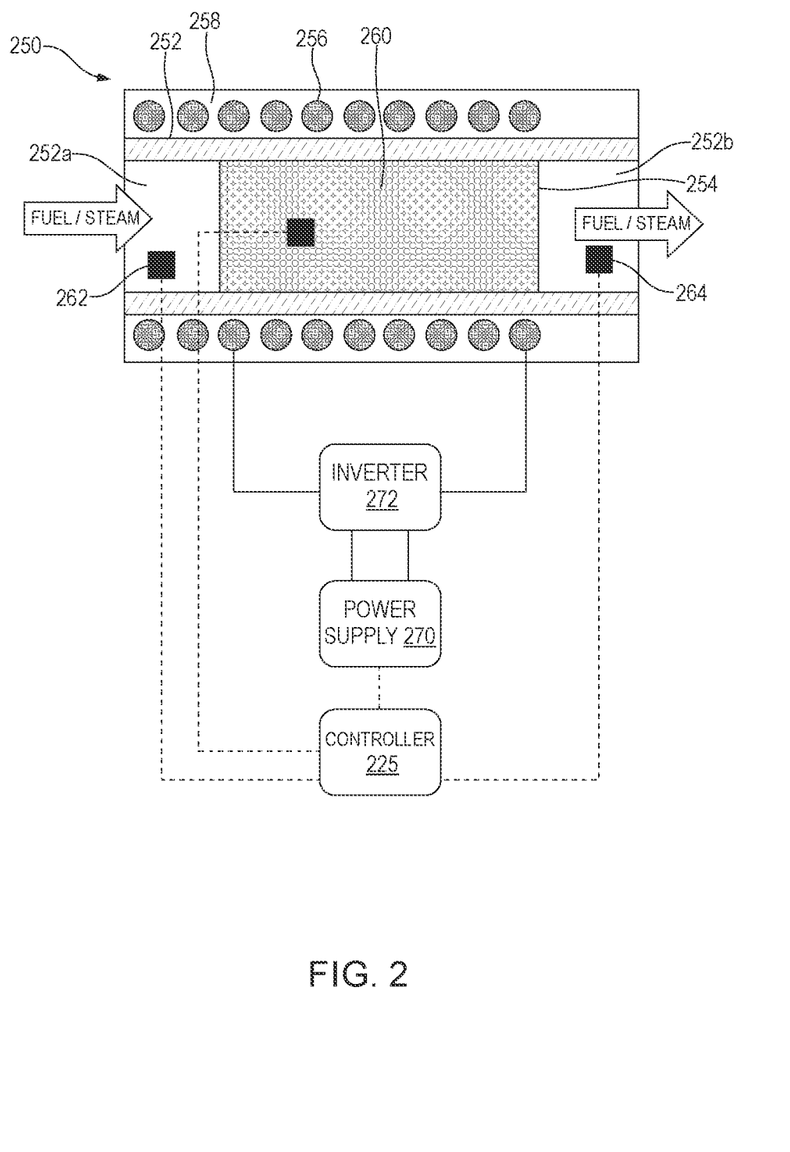
FIG. 2 is a schematic of a poison sensor, according to various embodiments of the present disclosure.

FIG. 2 is a schematic view showing the catalyst sensor 250 of FIG. 1, according to various embodiments of the present disclosure. Referring to FIGS. 1 and 2, the catalyst sensor 250 may include a housing 252, a catalyst 254 disposed in the housing 252, a heating element 256, optional insulation 258, a catalyst temperature sensor 260, an inlet temperature sensor 262, and an outlet temperature sensor 264.

The housing 252 may be tube or conduit, which may be formed of a metal or metal alloy such as Inconel, and may have an inlet 252a fluidly connected to the bypass conduits 310a, 310b, and an opposing outlet 252b fluidly connected to the bypass conduit 310c. In some embodiments, the housing 252 may range from 50-200 mm in length, such as from 75-125 mm, in length, and may range from 15-50 mm, such as from 20-30 mm, in diameter (or width for non-cylindrical conduits). The catalyst 254 may be disposed in the housing 252 between the inlet 252a and the outlet 252b.

The catalyst 254 may comprise a reformation catalyst as disclosed with respect to the pre-reformer 112. In some embodiments, the catalyst 254 may have an operating temperature (e.g., a temperature or temperature range at which the highest reformation reaction rate occurs) ranging from 350-800° C., such as 350-500° C., 350-450° C., 450-500° C., 500-550° C., 550-600° C., 600-650° C., 650-700° C., 700-800° C., or the like. For example, the catalyst 254 may include a metallic/ceramic foam with a catalytic layer (e.g., palladium, nickel, and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof.

In some embodiments, the catalyst 254 may comprise a low-temperature catalyst having an operating temperature of less than 700° C., such as an operating temperature ranging from 300-650° C. For example, the catalyst 254 may be any suitable noble metal catalyst or a transition metal catalyst, such as a copper-based, nickel-based or iron-based catalyst. In some embodiments, the catalyst 254 may be puck-shaped, strip-shaped, or any other suitable shape. In various embodiments, the catalyst 254 may include multiple units or sections, such as multiple pucks or strips.

The heating element 256 may be disposed around the housing 252 and may be configured to heat the catalyst 254 to a corresponding operating temperature of the catalyst 254. The heating element 256 may be an electromagnetic induction heating element or a resistive heating element. In some embodiments, the optional insulation 258 may be a thermally and electrically insulating material, such as a hydrogel or glass wool. Optionally, the heating element 256 may extend upstream of the catalyst 254 to preheat the fuel to a desired inlet temperature.

The heating element 256 may be electrically connected to a direct current (DC) power supply 270 and an inverter 272.

The inverter 272 may be utilized to invert DC power provided by the power supply 270, in order to provide alternating current (AC) power to the heating element 256. According to various embodiments, the power supply 270 may convert DC power generated by the fuel cell stack 102 to a wattage sufficient to power the heating element 256. In other embodiments, an AC power supply may be used to directly provide AC power to the heating element 256.

The catalyst temperature sensor 260 may be configured to detect the temperature of the catalyst 254, the inlet temperature sensor 262 may be configured to detect the temperature of fluid entering the catalyst 254 (i.e., an inlet temperature), and the outlet temperature sensor 264 may be configured to detect the temperature of fluid exiting the catalyst 254 (i.e., an outlet temperature). The temperature sensors 260, 262, 264 may be any suitable type of temperature sensor, such as a thermocouple or the like.

The controller 225 may be configured to control the power supply 270 based on a temperature data provided by the catalyst temperature sensor 260. In particular, the controller 225 may be configured to control the power applied to the heating element 256, such that the catalyst 254 is maintained at a desired operating temperature.

The controller 225 may also receive temperature data generated by the inlet temperature sensor 262 and the outlet temperature sensor 264. In particular, the controller 225 may be configured to monitor changes in the inlet and/or outlet temperatures, in order to determine whether catalyst poisoning has occurred. The controller 225 may be configured to generate an alarm signal indicating that contaminants are present in the fuel, if the controller 225 determines that the catalyst sensor 250 has been poisoned.

Fuel reformation is an endothermic reaction. Therefore, the outlet temperature at sensor 264 should be lower than the inlet temperature at sensor 262 if a reformation reaction is occurring at the catalyst 254 because the endothermic fuel reformation reaction at the catalyst 254 reduces the fuel temperature, despite the fuel passing through the housing 252 heated by the heating element 256. Alternatively, the heating element 256 of the catalyst sensor 250 may be configured to hold the outlet temperature at the sensor 264 at a constant temperature value. If the power draw of the heating element 256 is decreased, then this would also be an indication of catalyst poisoning.

For example, as discussed in more detail below, the controller 225 may be configured to generate an alarm signal, if the outlet temperature at sensor 264 increases relative to the inlet temperature at sensor 262, which indicates that the catalyst 254 has been poisoned and that the reformation reaction is either no longer occurring or is occurring at a lower rate. For example, if the rate (i.e., slope of temperature versus time) of outlet temperature at sensor 264 increases relative to the rate of inlet temperature at sensor 262, then the controller may generate the alarm signal. For example, the controller 225 may be configured to generate the alarm signal if the outlet temperature at sensor 264 increases at a time-averaged rate that exceeds a set temperature increase rate, while the inlet temperature at sensor 262 does not increase or increases at a lower time-averaged rate. For example, the time-average rate may be an average rate of temperature change calculated over a time period of at least 30 minutes, at least 45 minutes, or at least one hour, such as a time period ranging from about 15 minutes to about 2.5 hours, such as from about 30 minutes to about 2 hours, about 30 minutes to about 1.5 hours, or about 1 hour.

In another embodiment, if the outlet temperature at sensor 264 exceeds the inlet temperature at sensor 262 by a set amount and/or for a set time period, then the controller 225 may be configured to generate an alarm signal. For example, the controller 225 may generate the alarm signal if the outlet temperature exceeds the inlet temperature, by at least 1° C., at least 5° C., at least 10° C., at least 20° C., at least 30° C., at least 50° C., at least 75° C., or at least 100° C., for a time period of at least 15 minutes, of at least 30 minutes, at least 45 minutes, at least 1 hour, at least 1.5 hours, or at least 2 hours.

Figure 3:
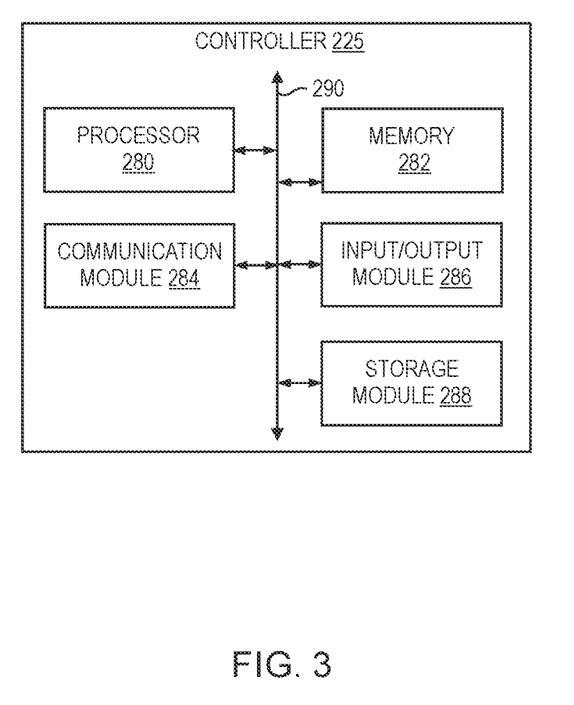
FIG. 3 is a block diagram of a controller, according to various embodiments of the present disclosure.

FIG. 3 is a block diagram of a controller 225, according to various embodiments of the present disclosure.

In one embodiment, the controller 225 may include a processor 280, memory 282, a communication module 284, an input/output (I/O) module 286, and a storage module 288. The memory 282 is capable of storing machine-executable instructions. The processor 280 can be a microcontroller, a microprocessor, a single-core processor, a multi-core processor, and/or a combination of one or more single-core processors and one or more multi-core processors.

The memory 282 may be embodied as one or more volatile memory devices, one or more non-volatile memory devices, and/or a combination. In at least some embodiments, the memory 282 stores logic and/or instructions, which may be used by processor 280 for controlling various components of the SOFC system 10. For example, the memory 282 includes logic for controlling the provision of fuel to the system in a steady-state mode; operating a catalyst sensor by providing a portion of the fuel and anode exhaust generated by the system to the catalyst sensor; detecting an outlet temperature of the catalyst sensor; and determining if a reformation catalyst of the catalyst sensor has been poisoned by contaminants in the fuel based on the detected outlet temperature, etc.

The communication module 284 may include communication circuitry such as a transceiver circuitry including an antenna and other communication media interfaces to connect with other devices. The communication circuitry may, in at least some example embodiments enable the reception of temperature data from temperature sensors such as catalyst temperature sensor 260, inlet temperature sensor 262, and outlet temperature sensor 264.

The input/output module 286 (hereafter referred to as an 'I/O module 286') may include mechanisms configured to receive inputs from and provide outputs to the operator(s) of the controller 225. To that effect, the I/O module 286 may include at least one input interface and/or at least one output interface. The storage module 288 is any computer-operated hardware suitable for storing and/or retrieving data. The various components of the controller 225, such as the processor 280, the memory 282, the communication module 284, the I/O module 286, and the storage module 288 are configured to communicate with each other via or through a centralized circuit system 290.

In one embodiment, the processor 280 is configured to monitor and control various components of the system 10 to control fuel and airflow through the system 10. The processor 280 is configured to control the operation of the catalyst sensor 250. In particular, the processor 280 may be configured to control a flow rate and composition of fluid provided to the catalyst sensor 250, by controlling the first, second, and/or third control valves 242, 244, 246. The communication module 284 is configured to receive pressure data from pressure sensors (such as first and second pressure sensors 227 and 229). The processor 280 may calculate a fuel flow rate to the catalyst sensor 250 based on the received pressure data. The controller 225 may be communicably coupled via the communication module 284 to the first, second, and third flow control valves.

The processor 280 may control the first control valve 242 and/or the third control valve 246, to adjust the fuel flow rate. The processor 280 may control the second control valve 244 to adjust the composition of the fluid provided to the catalyst sensor 250 e.g., the ratio of the fresh fuel to the anode exhaust and/or amounts of water, hydrogen, carbon monoxide, and/or carbon dioxide.

Further, the processor 280 is configured to isolate catalyst sensor 250 from the system 10 through the operation of first, second, and third control values 242, 244, and 246. When the catalyst sensor 250 is isolated, the system 10 is in steady-state mode during which the fuel is provided to the stack 102, and heating element 256 is turned off by the processor 280.

The processor 280 is configured to initialize the catalyst sensor 250 for operation. In particular, the processor 280 may control a voltage or current applied to the heating element 256 to heat the catalyst 254 to a predefined temperature. The communication module 284 is configured to receive temperature data from temperature sensor 260. The processor 280 may be configured to control the voltage or current applied to the heating element 256 based on the temperature data, to ensure that the catalyst 254 is maintained at a predefined operating temperature.

Further, the processor 280 is configured to operate the catalyst sensor 250 by providing a portion of fuel from fuel line and anode exhaust generated by the system 10. The processor 280 is configured to control the provision of fuel and anode exhaust to the catalyst sensor 250 through the use of first, second, and third control valves.

The communication module 284 is configured to receive temperature data from a temperature sensor placed at the outlet of the catalyst sensor 250. In one embodiment, the processor 280 may detect a change in temperature at the outlet of the catalyst sensor 250 and the processor 280 determines whether a reformation catalyst of the catalyst sensor 250 is poisoned by contaminants in the fuel based on the detected change in the outlet temperature. In another embodiment, the processor 280 may detect the temperature at the outlet of the sensor 250 and operate the heating element 256 to maintain the outlet temperature of the catalyst sensor 250 at a predetermined constant value (i.e., operating temperature). The processor 280 may determine whether a reformation catalyst of the catalyst sensor has been poisoned by contaminants in the fuel based on a decrease in the amount of power drawn by the heating element 256.

Upon detection of contamination, the processor 280 may generate an alarm signal indicating contamination of the fuel. In addition to the generation of the alarm signal, the processor 280 may control a selection valve 184 to select either bed 180 or bed 182.

Contaminant Detection Methods

Figure 4A:
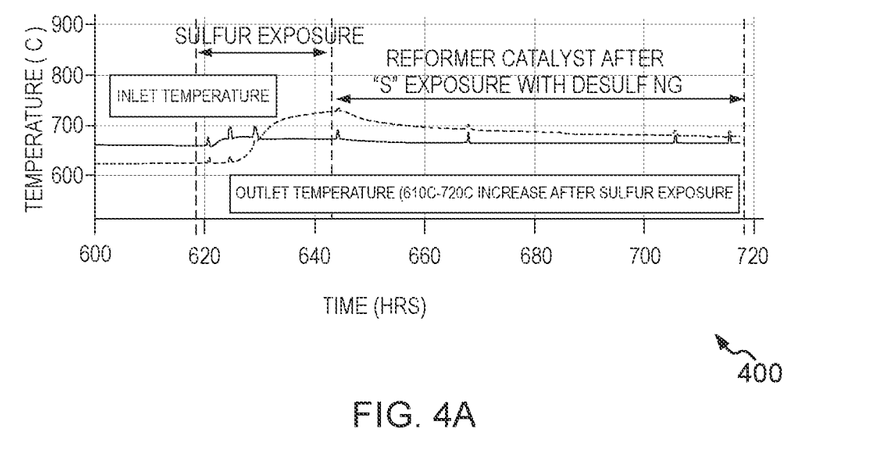
FIG. 4A is a graph showing changes in the inlet and outlet temperatures of a catalyst sensor provided with sulfur-containing natural gas and with desulfurized natural gas, according to various embodiments of the present disclosure.
Figure 4B:
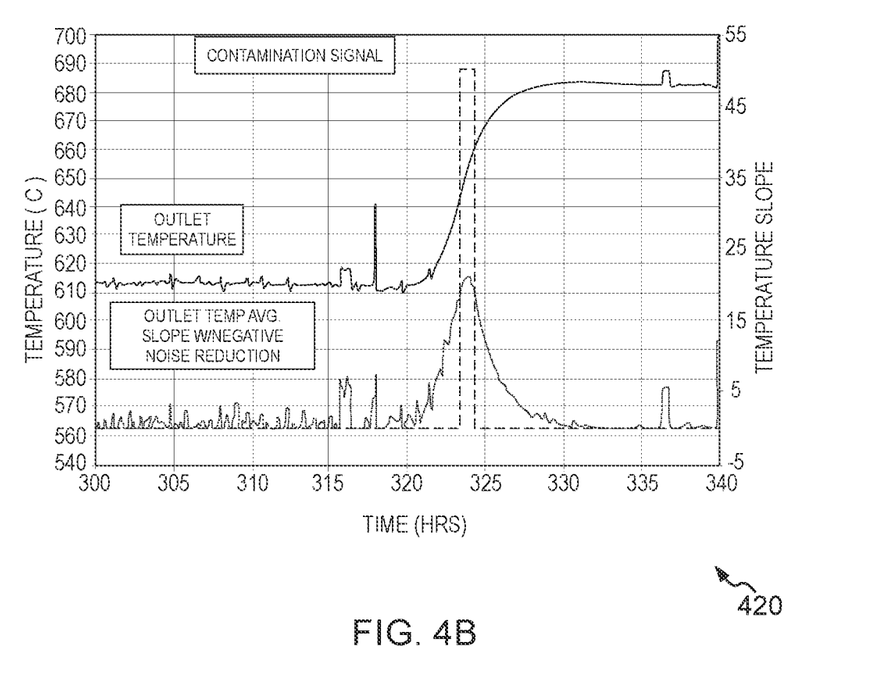
FIG. 4B is a graph showing the outlet temperature of a catalyst sensor over time, a moving one-hour average slope corresponding to the rate of temperature change of the outlet temperature, and a contamination signal generated due to the slope exceeding a set level, according to various embodiments of the present disclosure.

FIG. 4A is a graph 400 showing changes in the inlet and outlet temperatures of a catalyst sensor provided with sulfur-containing natural gas and with desulfurized natural gas, according to various embodiments of the present disclosure. FIG. 4B is a graph 420 showing the outlet temperature of a catalyst sensor over time, a moving one hour average slope corresponding to the rate of temperature change of the outlet temperature, and a contamination signal generated due to the slope exceeding a set level, according to various embodiments of the present disclosure.

Referring to FIG. 4A, during operating hours 600-619, the catalyst sensor was provided with desulfurized natural gas and the inlet temperature of the catalyst sensor was higher than the outlet temperature. Since hydrocarbon fuel reformation is an endothermic reaction, the outlet temperature being lower than the inlet temperature indicates that a reformation reaction was occurring in the catalyst sensor at an expected rate, and that the catalyst sensor was operating normally.

During operating hours 619 to 642, sulfur-containing natural gas was provided to the catalyst sensor. During the sulfur exposure, the outlet temperature increased and exceeded the inlet temperature. In particular, the outlet temperature increased from 610° C. to 720° C. during the sulfur exposure. It is believed that this increase in outlet temperature was the result of a reduction in the reaction rate of the reformation reaction, due to catalyst poisoning, and the heating of the fuel by the heating element.

During operating hours 642-720, the sulfur exposure was stopped and the catalyst sensor was provided with desulfurized natural gas. The outlet temperature gradually decreased until it was about 10-20° C. higher than the inlet temperature. It is believed that the decrease in the outlet temperature may be due to desorption of some of the sulfur from the catalyst. However, the outlet temperature remained above the inlet temperature for more than 80 hours of operation.

Referring to FIG. 4B, it can be seen that the outlet temperature of the outlet sensor began to increase around operating hour 320. During hour 324 of operation, the slope of the temperature change curve exceeded a threshold amount (e.g., 18.5 in this example), which indicated catalyst poisoning and resulted in the generation of an alarm signal. It is noted that since the slope of the temperature change was calculated based on an hourly average slope, brief outlet temperature changes did not result in the generation of the alarm signal.

Accordingly, catalyst poisoning may be detected based on the time averaged slope of an outlet temperature curve exceeding a set slope, such as a slope of at least about 15, at least about 17, at least about 18, or at least about 20, during a time period ranging from about 30 minutes to about 2 hours, such as about 1 hour. Catalyst poisoning may also be detected based on the outlet temperature exceeding the inlet temperature by a set amount, such as by at least 10° C., at least 20° C., at least 50° C., or at least 100° C. It should be noted that the temperature does not have to be plotted against time as shown in FIG. 4B to detect catalyst poisoning during the system operation, as long as the controller can determine the rate of temperature increase of the outlet temperature, and determine if the rate exceeds a threshold rate.

Figure 5:
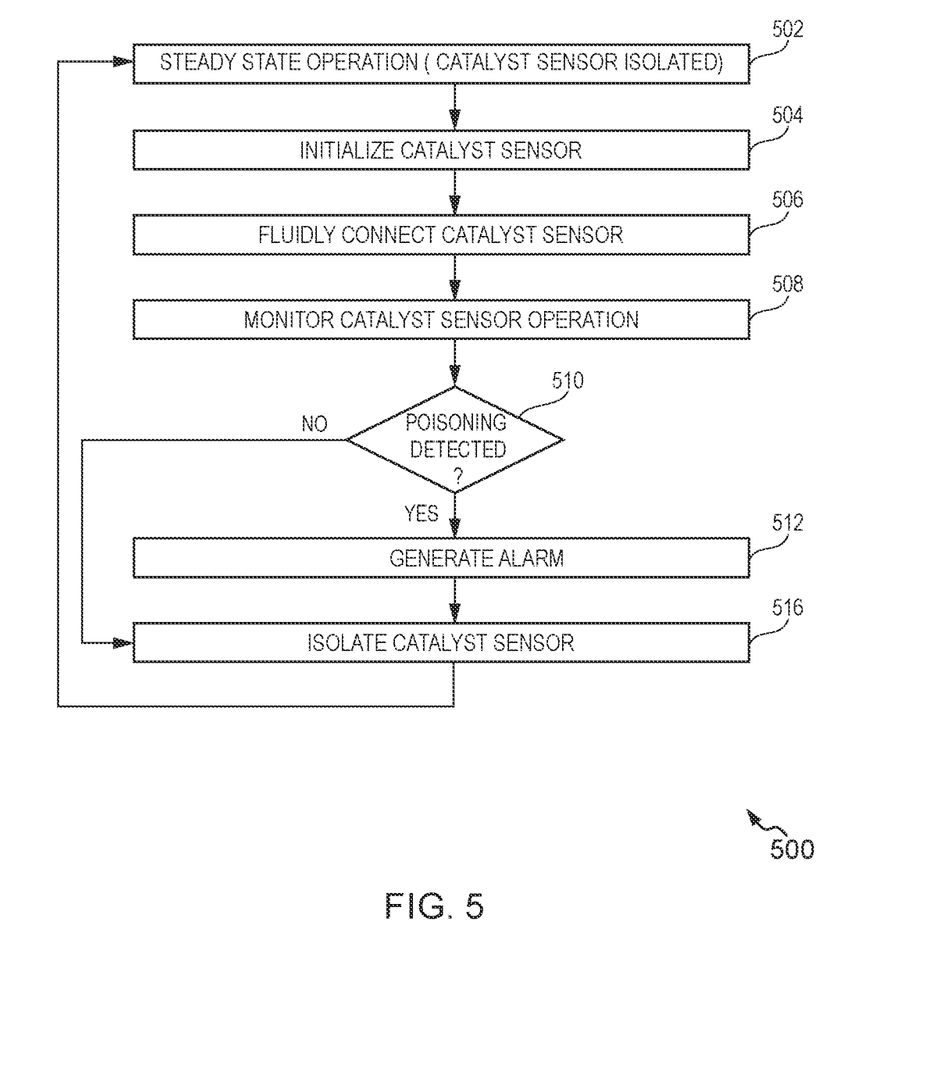
FIG. 5 is a flow diagram showing the steps of a fuel poison detection method, according to various embodiments of the present disclosure.

FIG. 5 is a flow diagram 500 showing the steps of a fuel contaminant detection method, according to various embodiments of the present disclosure. Referring to FIGS. 1, 2, 3, 4A, 4B, and 5, in operation 502, the system 10 may be operated in a steady-state mode and the catalyst sensor 250 may be fluidly isolated and not heated. In particular, the first, second, and third control valves 242, 244, 246 may be closed, such that fluid (e.g., fuel, water and/or anode exhaust) does not flow through the catalyst sensor 250. Furthermore, the heating element 256 may be turned off.

In operation 504, the catalyst sensor 250 may be initialized to prepare the catalyst sensor 250 for operation. In particular, a voltage or current may be applied to the heating element 256 to heat the catalyst 254 to a selected catalyst operating temperature, as discussed above. The temperature of the catalyst 254 may be monitored by sensor 260 and the voltage or current may be periodically applied to the heating element 256, to insure that the catalyst 254 is maintained at the set operating temperature.

In operation 506, once the catalyst 254 has reached a selected operating temperature, the first, second, and third control valves 242, 244, 246 may be opened. In particular, the first control valve 242 and the third control valve 246 may be opened to allow fuel to flow through the catalyst sensor 250. The second valve 244 may also be opened to provide anode exhaust to the catalyst sensor 250. In particular, the anode exhaust may be provided as a source of water, in order for fuel reformation reactions to occur in the catalyst 254.

In operation 508, the operation of the catalyst sensor 250 may be monitored over time. For example, the inlet temperature and the outlet temperature of the catalyst sensor 250 may be detected by the inlet and outlet temperature sensors 262, 264 and continuously or periodically provided to the controller 225.

In operation 510, the controller 225 may determine whether the catalyst 254 has been poisoned due to the adsorption of contaminants from the fluids provided to the catalyst sensor 250. In particular, catalyst poisoning may be determined by monitoring inlet and/or outlet temperatures of the catalyst sensor 250. In particular, fuel reformation is an endothermic process. As such, catalyst poisoning may be determined by monitoring inlet and/or outlet temperatures and their rates of the catalyst sensor 250, in order to detect whether an outlet temperature or its rate increase that indicates catalyst poisoning has occurred.

For example, if the detected outlet temperature is lower than the detected inlet temperature and/or if the outlet temperature rate of increase with time is lower than a predetermined value, then the controller 225 may determine that the catalyst sensor 250 is operating normally (e.g., the catalyst 254 has not been poisoned by adsorbed contaminants). On the contrary, if contaminants are present in the fuel, contaminants may be adsorbed onto the catalyst 254, there by poisoning the catalyst 254. As a result, if the detected outlet temperature is higher than the detected inlet temperature and/or if the outlet temperature rate of increase with time is higher than a predetermined value, then the controller 225 may determine that the catalyst 254 is poisoned.

If catalyst poisoning is detected, the method may proceed to operation 512. In operation 512, it is determined that contaminants are present in the fuel and an alarm signal is generated if the reformation catalyst 254 is determined to have been poisoned. The alarm signal may be generated by the controller 225, indicating the presence of contaminants. In some embodiments, operation 512 may include switching from an exhausted catalyst bed 180, 182 to a reserve catalyst bed 180, 182. The exhausted catalyst bed may then be replaced or cleaned.

After the alarm has been generated and/or after the monitoring period of operation 406 has expired, the method may proceed to operation 516. In operation 516, the catalyst sensor 250 may be isolated by closing first, second, and third control valves 242, 244, 246. The method may then end or return to operation 502.

Figure 6:
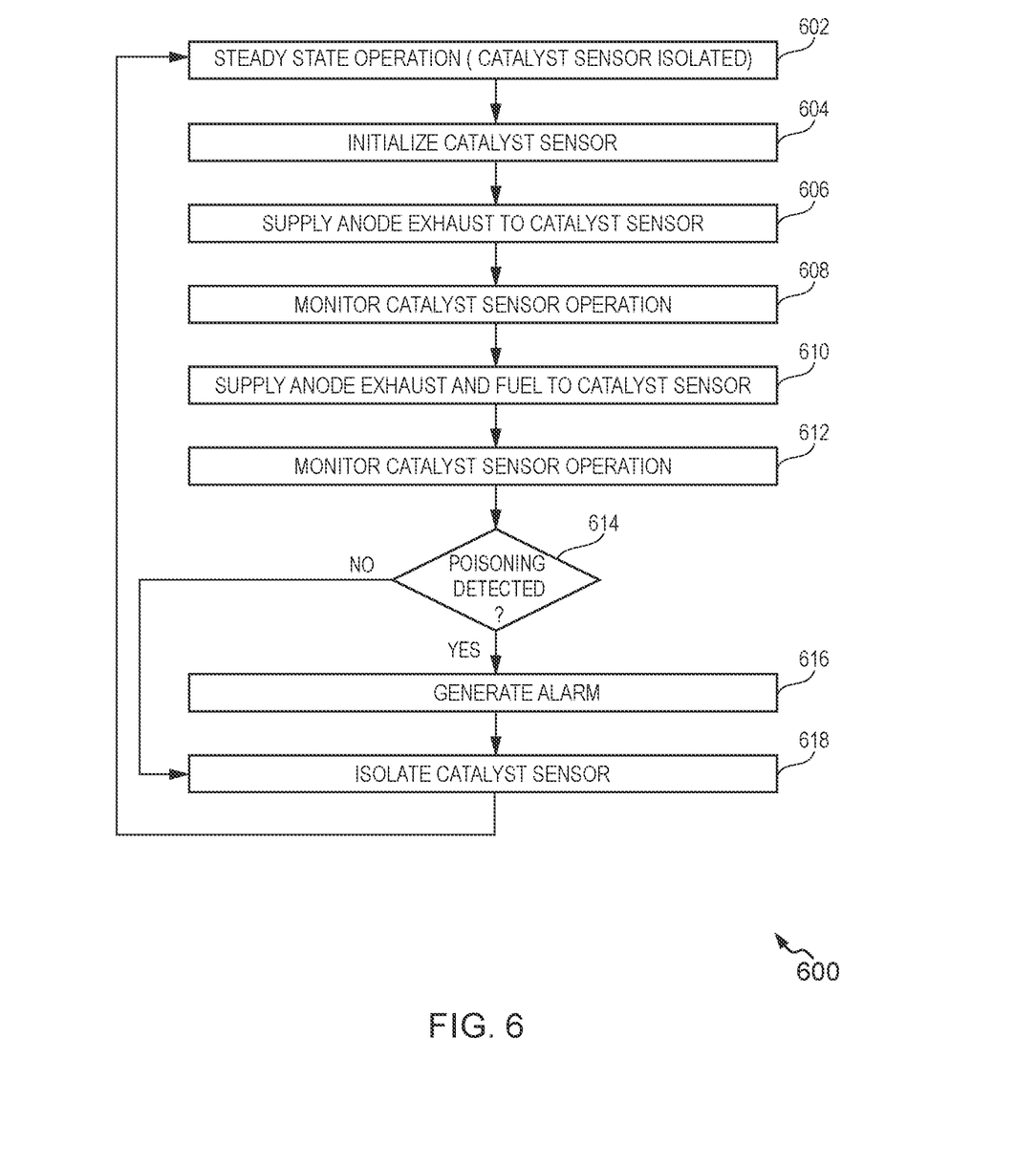
FIG. 6 is a flow diagram showing the steps of a modified contaminant detection method, according to various embodiments of the present disclosure.

FIG. 6 is a flow diagram 600 showing the steps of a modified contaminant detection method, according to various embodiments of the present disclosure. Referring to FIGS. 1, 2, 3, 4A, 4B, and 6, in operation 602, the system 10 may be operated in a steady-state mode and the catalyst sensor 250 may be fluidly isolated and not heated. In particular, the first, second, and third control valves 242, 244, 246 may be closed, such that fluid (e.g., fuel, water and/or anode exhaust) does not flow through the catalyst sensor 250. Furthermore, the heating element 256 may be turned off.

In operation 604, the catalyst sensor 250 may be initialized to prepare the catalyst sensor 250 for operation. In particular, a voltage or current may be applied to the heating element 256 to heat the catalyst 254 to a selected catalyst operating temperature, as discussed above. The temperature of the catalyst 254 may be monitored by sensor 260 and the voltage or current may be periodically applied to the heating element 256, to ensure that the catalyst 254 is maintained at the set operating temperature.

In operation 606, once the catalyst 254 has reached a selected operating temperature, the second and third control valves 244, 246 may be opened to allow anode exhaust to flow through the catalyst sensor 250, while the first control valve 242 is closed. Thus, the second valve 244 and the third valve 246 may be opened prior to opening the first valve 242. In particular, the operation of the anode recycle blower 212 may generate a higher pressure in recycling conduit 308f than in recycling conduit 308e. As a result, anode exhaust may flow through bypass conduit 310b, the catalyst sensor 250, and bypass conduit 310c, before returning to recycling conduit 308e.

In operation 608, the temperature of the catalyst sensor 250 may be monitored. In particular, the inlet temperature, the outlet temperature, and/or the temperature of the catalyst 254 may be detected and periodically or continuously provided to the controller 225. While the second valve 244 and the third valve 246 are opened and the first valve 242 is closed, the sensor 250 may be used to measure the humidity and/or the composition of the anode exhaust. For example, an increase in the catalyst sensor 250 outlet temperature may be attributed to changes in humidity and/or composition of the anode exhaust rather than due to catalyst 254 poisoning, since the fresh fuel from bypass conduit 310a is not provided to the catalyst sensor 250 while the first valve 242 is closed. The catalyst sensor 250 may be monitored in operation 506 for a set time period, such as a time period ranging from 5 minutes to 30 hours, such as from about 15 minutes to about 1 hour.

Thus, the controller 225 is configured to open the second and the third flow control valves 244, 246 prior to opening the first flow control valve 242 and to determine at least one property of the anode exhaust before the first flow control valve 242 is opened. Therefore, in the method of FIG. 6, a portion of the anode exhaust is provided to the catalyst sensor 250 prior to providing the fuel to the catalyst sensor 250, and at least one property of the anode exhaust is determined.

In operation 610, the first valve 242 may then be opened after the effects of humidity and/or composition of the anode exhaust on the catalyst sensor 250 are determined. After the first control valve 242 is opened, fluid flows through each of the first, second, and third control valves 242, 244, 246. In particular, the first control valve 242 and the second control valve 244 may be open to allow fresh fuel and anode exhaust to flow through the catalyst sensor 250. In particular, the anode exhaust may be used to provide water to the catalyst sensor 250, in order for fuel reformation reactions to occur in the catalyst 254.

In operation 612, the operation of the catalyst sensor 250 may be monitored for a set time period. For example, the catalyst sensor 250 may be monitored for a time period ranging from 10 minutes to several days, such as from 1 hour to 24 hours. In other embodiments, operation 612 may be performed continuously during the operation of the system 10, or until catalyst poisoning is detected. Operation 612 may include monitoring the inlet temperature and/or the outlet temperature of the catalyst sensor 250, which may be detected by the inlet and outlet temperature sensors 262, 264. The temperature data may be continuously or periodically provided to the controller 225 during operation 612.

In operation 614, the controller 225 may determine whether contaminants are present in the fluids (e.g., fuel) provided to the catalyst sensor 250, by determining whether the catalyst 254 has been poisoned by contaminant adsorption. In particular, fuel reformation is an endothermic process. As such, catalyst poisoning may be determined by monitoring inlet and/or outlet temperatures and their rates of the catalyst sensor 250, in order to detect whether an outlet temperature increase indicates catalyst poisoning has occurred.

For example, if the detected outlet temperature is lower than the detected inlet temperature and/or if the outlet temperature rate of increase with time is lower than a predetermined value, then the controller 225 may determine that the catalyst sensor 250 is operating normally (e.g., the catalyst 254 has not been poisoned by adsorbed contaminants). On the contrary, if contaminants are present in the fuel, contaminants may be adsorbed onto the catalyst 254, thereby poisoning the catalyst 254. As a result, if the detected outlet temperature is higher than the detected inlet temperature and/or if the outlet temperature rate of increase with time is higher than a predetermined value, then the controller 225 may determine that the catalyst 254 is poisoned.

If catalyst poisoning is detected, the method may proceed to operation 616. In operation 616, it is determined that the contaminants are present in the fuel and an alarm signal is generated if the reformation catalyst 254 is determined to have been poisoned. The alarm signal may be generated by the controller 225, indicating the presence of contaminants. In some embodiments, operation 616 may include switching from an exhausted catalyst bed 180, 182 to a reserve catalyst bed 180, 182. The exhausted catalyst bed may then be replaced or cleaned.

After the alarm has been generated and/or after the monitoring period of operation 612 has expired, the method may proceed to operation 618. In operation 618, the catalyst sensor 250 may be isolated by closing first, second, and third control valves 242, 244, 246. The method may then end or return to operation 602.

According to various embodiments, fuel cell systems and methods are provided that utilize a reformation catalyst sensor to detect fuel contaminants, such as sulfur and/or phosphorus species. In particular, inlet and outlet temperatures of the catalyst sensor can be monitored over time, to determine whether a catalyst of the catalyst sensor has been poisoned due to the adsorption of fuel contaminants. For example, the increase rate the outlet temperature and/or a temperature differential between the inlet and outlet temperature can be utilized to identify catalyst poisoning.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

We claim:
1. A fuel cell system, comprising:
a fuel cell stack;
a fuel line configured to provide fuel to the fuel cell stack;
a recycle blower;
a second recycling conduit configured to receive anode exhaust from the recycle blower;
a second bypass conduit configured to provide the anode exhaust from the second recycling conduit to a catalyst sensor;
the catalyst sensor configured to receive the fuel from the fuel line and the anode exhaust generated by the fuel cell stack, the catalyst sensor comprising:
a housing comprising an inlet and an outlet;
a fuel reformation catalyst disposed in the housing between the inlet and the outlet;
an inlet temperature sensor configured to detect an inlet temperature of fluid in the inlet; and
an outlet temperature sensor configured to detect an outlet temperature of fluid in the outlet; and
a controller configured to detect poisoning of the fuel reformation catalyst based on temperature data provided by at least the outlet temperature sensor.

2. The system of claim 1, wherein the controller is configured to determine a presence of fuel contaminants in the fuel, based on the temperature data provided by at least the outlet temperature sensor.

3. The system of claim 2, wherein the controller is configured to generate an alarm signal indicating the presence of the fuel contaminants, if the outlet temperature exceeds the inlet temperature.

4. The system of claim 2, wherein the controller is configured to generate an alarm signal indicating the presence of the fuel contaminants, if the outlet temperature is detected to increase at a time-averaged rate that exceeds a set temperature increase rate.

5. The system of claim 2, wherein the controller is configured to generate an alarm signal indicating the presence of the fuel contaminants, if a rate of change of the outlet temperature increases relative to a rate of change of the inlet temperature.

6. The system of claim 1, wherein the catalyst sensor further comprises:
a heating element disposed around the housing; and
a catalyst temperature sensor configured to detect a temperature of the fuel reformation catalyst,
wherein the controller is configured to control the heating element based on temperature data provided by the catalyst temperature sensor.

7. The system of claim 6, wherein the catalyst sensor further comprises insulation disposed on the housing and configured to thermally and electrically insulate the heating element.

8. The system of claim 6, wherein the heating element comprises a resistive heating element or an inductive heating element.

9. The system of claim 6, wherein the heating element is configured to heat the fuel reformation catalyst to a corresponding operating temperature of the fuel reformation catalyst.

10. The system of claim 1, wherein the fuel reformation catalyst is configured to operate at a temperature of less than 700° C., and wherein the fuel reformation catalyst comprises a noble metal based catalyst.

11. The system of claim 1, further comprising a hotbox housing the fuel cell stack, wherein the catalyst sensor is disposed outside of the hotbox.

12. The system of claim 11, further comprising:
a first recycling conduit configured to provide anode exhaust from the hotbox to the recycle blower;
a first bypass conduit configured to provide fuel from the fuel line to the inlet of the catalyst sensor; and
a third bypass conduit configured to fluidly connect the outlet of the catalyst sensor to the first recycling conduit.

13. The system of claim 12, further comprising a first flow control valve disposed on the first bypass conduit, a second flow control valve disposed on the second bypass conduit and a third flow control valve disposed on the third bypass conduit.

14. The system of claim 13, wherein the controller is configured to open the second and the third flow control valves prior to opening the first flow control valve and to determine at least one property of the anode exhaust before the first flow control valve is opened.

15. The system of claim 13, further comprising:
first and second adsorption beds fluidly connected to the fuel line upstream of the hotbox, with respect to a fuel flow direction through the fuel line; and
a selection valve disposed on the fuel line and configured to selectively provide the fuel to the first adsorption bed or the second adsorption bed,
wherein if the controller detects poisoning of the reformation catalyst, then the controller is configured to control the selection valve to provide the fuel to a different one of the first and second adsorption beds.

16. The system of claim 15, wherein the first and second adsorption beds are configured to adsorb contaminants from the fuel before providing to the catalyst sensor.

17. The system of claim 13, wherein the controller is configured to control the first flow control valve and/or the third flow control valve, to adjust a fuel flow rate of the fluid provided to the catalyst sensor.

18. The system of claim 13, wherein the controller is configured to control the second flow control valve to adjust composition of the fluid provided to the catalyst sensor.

19. The system of claim 13, further comprising:
a first pressure sensor located on the first bypass conduit upstream of the first flow control valve and configured to detect pressure in the first bypass conduit upstream of the first flow control valve;
a second pressure sensor located on the first bypass conduit downstream of the first flow control valve, and configured to detect pressure in the first bypass conduit downstream of the first flow control valve.

20. The system of claim 19, wherein the controller is configured to calculate a fuel flow rate of the fluid provided to the catalyst sensor, based on pressure data provided by the first and second pressure sensors.

* * * * *

UNITED STATES PATENT AND TRADEMARK OFFICE
CERTIFICATE OF CORRECTION

PATENT NO. : 12,444,761 B2
APPLICATION NO. : 17/892362
DATED : October 14, 2025
INVENTOR(S) : Laxmikant Girwalkar et al.

Page 1 of 1

It is certified that error appears in the above-identified patent and that said Letters Patent is hereby corrected as shown below:

On the Title Page

First column, add:
"(30) Foreign Application Priority Data
August 23, 2021 (IN) ....................... 202141038185"

Signed and Sealed this
Twenty-third Day of December, 2025

John A. Squires
*Director of the United States Patent and Trademark Office*